(12) United States Patent
Kratzer et al.

(10) Patent No.: US 11,440,287 B2
(45) Date of Patent: Sep. 13, 2022

(54) HYBRID FIBER MULTI-AXIAL PREPREG

(71) Applicant: HONEYWELL INTERNATIONAL INC., Morris Plains, NJ (US)

(72) Inventors: Gary Kratzer, Midlothian, VA (US); David A. Hurst, Richmond, VA (US); Lori L. Wagner, Richmond, VA (US); Ashok Bhatnagar, Richmond, VA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 294 days.

(21) Appl. No.: 16/421,237

(22) Filed: May 23, 2019

(65) Prior Publication Data

US 2019/0375185 A1    Dec. 12, 2019

Related U.S. Application Data

(60) Provisional application No. 62/681,932, filed on Jun. 7, 2018.

(51) Int. Cl.
| | |
|---|---|
| *B32B 5/26* | (2006.01) |
| *B32B 1/08* | (2006.01) |
| *B32B 5/12* | (2006.01) |
| *B29C 70/30* | (2006.01) |
| *B32B 37/20* | (2006.01) |
| *B29L 23/00* | (2006.01) |

(52) U.S. Cl.
CPC ............ *B32B 5/26* (2013.01); *B29C 70/30* (2013.01); *B32B 1/08* (2013.01); *B32B 5/12* (2013.01); *B32B 37/20* (2013.01); *B29L 2023/22* (2013.01); *B32B 2597/00* (2013.01)

(58) Field of Classification Search
CPC ..... B29C 53/566; B29C 53/582; B29C 70/08; B29C 70/30; B29C 70/462; B29L 2023/22; B32B 1/08; B32B 2250/20; B32B 2260/023; B32B 2260/046; B32B 2597/00; B32B 2262/101; B32B 2262/106; B32B 5/12; Y10T 428/24124; Y10T 428/2495; F41H 1/02; F41H 1/08; F41H 5/0485
USPC .......... 428/36.1, 297.4, 113, 156, 107; 2/2.5
See application file for complete search history.

(56) References Cited

U.S. PATENT DOCUMENTS

| | | | |
|---|---|---|---|
| 5,538,769 | A | 7/1996 | Sandman, Jr. |
| 6,642,159 | B1 | 11/2003 | Bhatnagar et al. |
| (Continued) | | | |

FOREIGN PATENT DOCUMENTS

| | | |
|---|---|---|
| CA | 2216508 | 8/1998 |
| CN | 105235302 | 1/2016 |
| (Continued) | | |

OTHER PUBLICATIONS

Supplemental European Search Report for EP App. No. 19866303.1.
International Search Report for PCT/US2019/035603.

*Primary Examiner* — Camie S Thompson
(74) *Attorney, Agent, or Firm* — Roberts & Roberts, LLP; Richard S. Roberts, Jr.

(57) ABSTRACT

Multi-ply, hybrid composite materials useful in the formation of thin walled, hollow, tubular articles having improved resistance to hoop stress. Two different, single-ply pre-pregs are impregnated with binders and laminated together with the fibers of the layers oriented at a bias relative to each other. The hybrid composite is rolled into a tubular article having excellent strength uniformity along the full length of the tubular article.

20 Claims, 6 Drawing Sheets

(56) References Cited

U.S. PATENT DOCUMENTS

| | | |
|---|---|---|
| 6,805,642 B2 | 10/2004 | Meyer |
| 8,001,716 B1 | 8/2011 | Lepage et al. |
| 8,114,329 B2 | 2/2012 | Karem |
| 2004/0200123 A1 | 10/2004 | Whiting |
| 2014/0272267 A1* | 9/2014 | Grunden ............... F41H 5/0485 428/102 |
| 2016/0320156 A1 | 11/2016 | Curliss et al. |
| 2017/0080678 A1 | 3/2017 | Bhatnagar et al. |
| 2017/0114198 A1 | 4/2017 | Tudor et al. |

FOREIGN PATENT DOCUMENTS

| | | |
|---|---|---|
| JP | 8224329 | 9/1996 |
| JP | 2000189005 | 7/2000 |
| JP | 2005279098 | 10/2005 |
| JP | 2007117730 | 5/2007 |
| JP | 04364700 | 11/2009 |
| JP | 2010063778 | 3/2010 |
| JP | 2011147543 | 8/2011 |
| JP | 04873879 | 2/2012 |
| JP | 05283373 | 9/2013 |
| JP | 05356265 | 12/2013 |

\* cited by examiner

HYBRID FIBER MULTI-AXIAL PREPREG

CROSS-REFERENCE TO RELATED APPLICATION

This application claims the benefit of U.S. Provisional Application Ser. No. 62/681,932, filed on Jun. 7, 2018, the disclosure of which is incorporated by reference herein in its entirety.

BACKGROUND

Technical Field

This technology relates to lightweight, tubular composite articles having exceptional hoop strength.

Description of the Related Art

Carbon fiber composite tubing has long been used as a substitute for metal or plastic tubing for commercial products across various industries. The strength and light weight of carbon fiber composites makes them particularly useful for the fabrication of thin walled, hollow, cylindrical articles that are used as weight bearing supports or which are subjected to significant hoop (cylindrical) stress, such as fishing rods, golf clubs, tent supports, ski poles, bicycle frames, etc. Such tubular composite structures are typically non-woven composites formed by pultrusion, which is a process for the continuous formation of materials having a constant cross-section, or by helically wrapping layers of a composite fabric, woven or non-woven, around a mandrel, allowing for the fabrication of tubes having variable cross-sections.

Despite the quality and effectiveness of existing light weight carbon fiber composite materials, evolving industry needs have led to the demand for materials having even lower weights without sacrificing performance, or having improved strength and performance at maintained light weights. In this regard, Japanese patent application JP2011147543 teaches carbon fiber composite shafts useful for golf clubs wherein the composite strength is maximized by combining multiple fabric layers with one of said layers being oriented at an angle of 20° to 70° relative to a second fabric layer formed from uniaxial fibers oriented at 0° along the longitudinal direction of the shaft. This arrangement has been found to increase torsional strength of the shaft. U.S. Pat. No. 8,001,716 teaches a fishing rod having two sections of carbon fiber composite materials wherein each section is impregnated with a toughened epoxy resin matrix. Similar to JP2011147543, layers of the two composite sections are arranged with the fibers oriented at a bias relative to each other. Japanese patent application JP2005279098 teaches an improved golf shaft formed by wrapping an inner section of a fiberglass pre-preg with an outer section of a carbon fiber pre-preg layer. The fibers of the fiberglass pre-preg layer are oriented at an angle of about 25° to 65° relative to the longitudinal axis of the shaft and the fibers of the carbon fiber pre-preg layer are oriented at 0° to 10°. Both sections are impregnated with a thermosetting resin such as an epoxy resin, and the construction requires that the resin content of the outer straight layer is greater than the resin content of the inner angled layer. Japanese patent application JPH1015129, on the other hand, teaches opposite constructions formed where an angled reinforcing layer has a greater resin content than a pre-preg layer formed from fibers oriented along the longitudinal axis of the shaft.

In each of the above referenced solutions, the improvements in tortional strength are limited to the specific shaft designs described in respective disclosures, for example, teaching different compositional requirements for different sections of their golf club shafts depending on their distances from their golf club heads. Accordingly, the advantages of their compositions do not apply universally regardless of shaft design or end use. Accordingly, there is a need in the art for an improved composite design for the fabrication of thin walled, hollow, cylindrical articles that provides universal enhancements circumferential stress resistance without being limited to any particular end use application or article design requirements. The present disclosure provides a solution to that need.

SUMMARY

It has been found that a multi-ply, hybrid composite material formed from two different non-woven, unidirectional fiber plies with one having a significantly greater fiber areal density than the other, and with the composite material having a high polymeric binder content of at least 30% by weight, hollow tubular articles may be formed having greater strength uniformity along the entire length of the tubular article relative to composites of the related art.

Particularly, the disclosure provides a multilayer, hollow, tubular article formed from a multi-ply, hybrid composite material, said hybrid composite material comprising:

a first unidirectional fibrous ply bonded to a second unidirectional fibrous ply, said first unidirectional fibrous ply comprising first fibers and a first polymeric binder material and said second unidirectional fibrous ply comprising second fibers and a second polymeric binder material, wherein the first fibers and the second fibers are different fiber types, wherein the first polymeric binder material and the second polymeric binder material combined comprise at least 30% by weight of the composite material, wherein the composite material has a fiber areal density of at least about 80 grams/m$^2$, wherein the second fibrous ply has a fiber areal density of at least three times the fiber areal density of the first fibrous ply, wherein the first fibrous ply has a fiber areal density of 20 grams/m$^2$ or less, and wherein the second fibrous ply has a fiber areal density of at least 60 grams/m$^2$;

wherein the hybrid composite material is overlapped onto and sealed to itself to form a multilayer, hollow, tubular article.

The disclosure also provides a process for forming a multilayer, hollow, tubular article comprising a multi-ply, hybrid composite material, the process comprising:

a) forming a first unidirectional fibrous ply comprising first fibers and a first polymeric binder material on a release substrate, wherein the first fibrous ply has a fiber areal density of 20 grams/m$^2$ or less;

b) providing a second unidirectional fibrous ply comprising second fibers and a second polymeric binder material, wherein the second fibrous ply has a fiber areal density of at least 60 grams/m$^2$ and wherein the first fibers and the second fibers are different fiber types;

c) laminating the first unidirectional fibrous ply onto the second unidirectional fibrous ply, d) removing the release substrate, whereby the first unidirectional fibrous ply remains on and is bonded to the second unidirectional fibrous ply, thereby forming a multi-ply, hybrid composite material wherein the first polymeric binder material and the second polymeric binder material combined comprise at least 30% by weight of the composite material, and wherein the composite material has a fiber areal density of at least about 80 grams/m²;

e) forming the composite material into a tubular structure by wrapping the composite material around itself, leaving a hollow central opening; and f) optionally subjecting the tubular structure to heat and/or pressure to consolidate the first and second unidirectional fiber plies together.

The disclosure further provides a multi-ply, hybrid composite material comprising:

a first ply of unidirectionally oriented elongate bodies bonded to a second ply of unidirectionally oriented elongate bodies, said first ply comprising first elongate bodies and a first polymeric binder material and said second ply comprising second elongate bodies and a second polymeric binder material, wherein the first elongate bodies and the second elongate bodies are different elongate body types, wherein the first polymeric binder material and the second polymeric binder material combined comprise at least 30% by weight of the composite material, wherein the composite material has a fiber areal density of at least about 80 grams/m², wherein the first ply has a fiber areal density of 20 grams/m² or less, and wherein the second ply has a fiber areal density of at least 60 grams/m².

DETAILED DESCRIPTION

Figure 1:
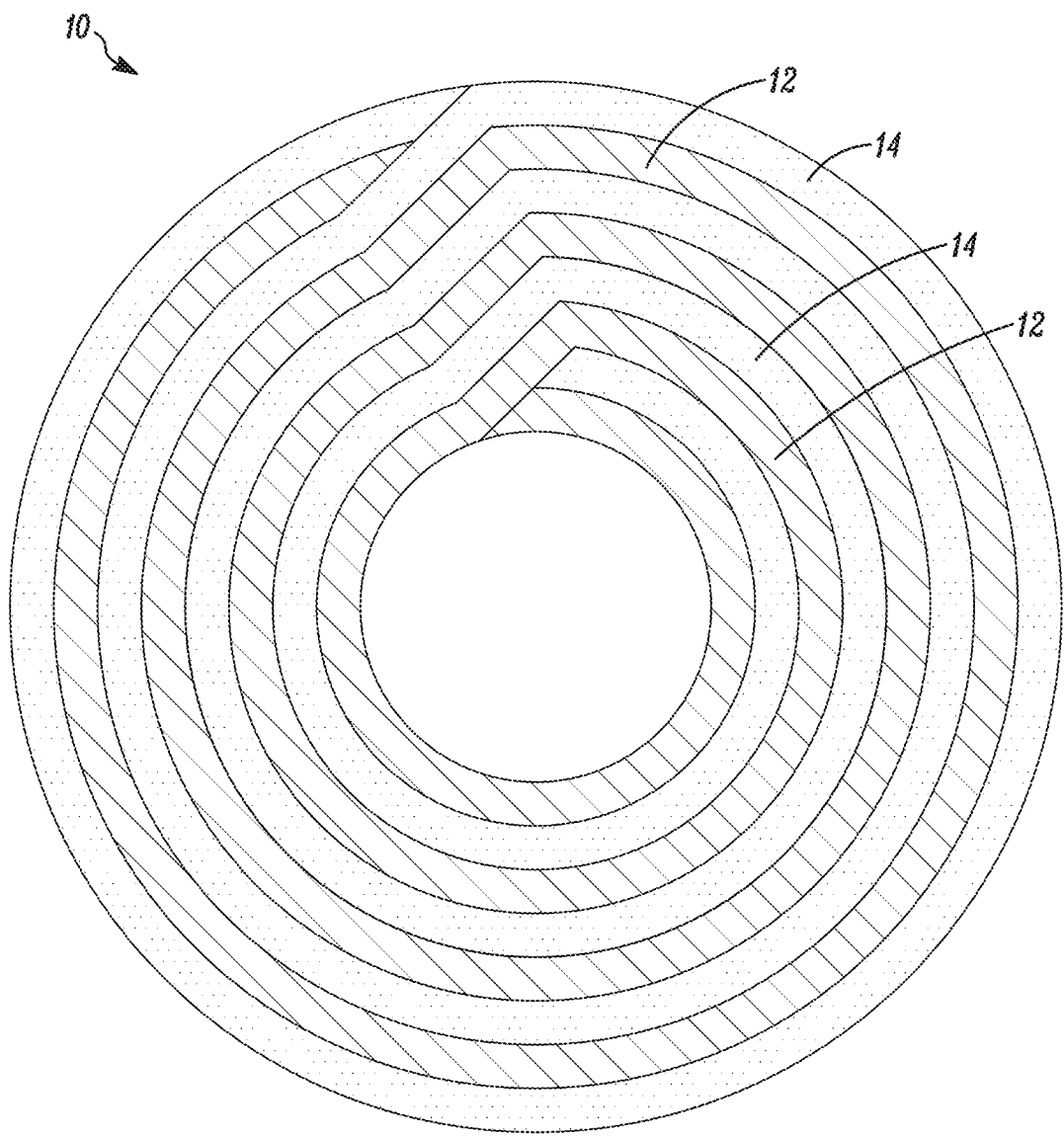
FIG. 1 is a side perspective view schematic representation of a hollow, tubular article formed from a 2-ply hybrid composite that is roll wrapped onto itself.

Multi-ply, hybrid composite materials are provided that may be utilized in virtually any high performance composite application but which are particularly useful in the formation of thin walled, hollow, tubular articles having improved resistance to hoop stress. In forming hybrid composites, two different, single-ply pre-pregs are fabricated and laminated together. The pre-pregs are fabricated from elongate bodies that may be fibers, fibrous tapes or a combination of fibers and fibrous tapes (e.g., fibers and tapes within a single ply or one ply formed from fibers and the other ply formed from tapes). Each ply comprises unidirectionally oriented elongate bodies. In this regard, the term "oriented" as used in this context of "unidirectionally oriented" elongate bodies (i.e., fibers or tapes) refers to the alignment of the fibers/tapes rather than to stretching of the fibers/tapes. Each ply is fabricated by coating unidirectionally oriented fibers with a polymeric binder material, as described in greater detail below, and laminating them together, preferably coextensively, whereby the two different materials are adhered to each other to form a two-ply composite material. This two-ply composite material 10 may then be rolled or wrapped around itself leaving a hollow central opening as illustrated in FIG. 1, wherein the top surface of the first unidirectional elongate body ply 12 (e.g., a first fibrous ply) is in contact with the bottom surface of the second elongate body ply 14, and wherein the bottom surface of the first elongate body ply 12 is in contact with the top surface of the second elongate body ply 14 (e.g., a second fibrous ply), also as illustrated in FIG. 1. It is also within the scope of this disclosure that the position of the two plies may be reversed and still achieve an effective product. By first forming the hybrid composite and thereafter wrapping the hybrid into a tubular shape, uniformity of composite strength and consistency of resistance to hoop stress along the tubular article is achieved. Prior art methods of wrapping a first material around a second material and subsequently laminating the materials together do not achieve the desired uniformity of composite strength and consistency of resistance to hoop stress, limiting the usefulness of the materials to specific applications.

Each of the unidirectional elongate body plies 12 and 14 is formed from a single array of substantially parallel, uniaxially oriented, unidirectional elongate bodies. As previously noted, said elongate bodies may be fibers (monofilament or multifilament) or fibrous tapes. As used herein, "fibrous" means that the elongate bodies comprise fibers. As used herein, a "fiber" is a long, continuous (but of a definite length) strand of a material, such as a strand of a polymeric material, the length dimension of which is much greater than the transverse dimensions of width and thickness, rather than a short segment of a strand referred to in the art as a "staple" or "staple fiber." As noted above a single "fiber" may be formed from just one filament or from multiple filaments. A "strand" by its ordinary definition is a single, thin length of something, such as a thread or fiber. The cross-sections of fibers for use herein may vary widely, and they may be circular, flat or oblong in cross-section. They also may be of irregular or regular multi-lobal cross-section having one or more regular or irregular lobes projecting from the linear or longitudinal axis of the filament. Thus the term "fiber" includes filaments, ribbons, strips and the like having regular or irregular cross-section. It is preferred that the fibers have a substantially circular cross-section. A fiber formed from just one filament is referred to herein as either a "single-filament" fiber or a "monofilament" fiber, and a fiber formed from a plurality of filaments is referred to herein as a "multifilament" fiber. Multifilament fibers as defined herein preferably include from 2 to about 3000 filaments, more preferably from 2 to 1000 filaments, still more preferably from 30 to 500 filaments, still more preferably from 40 to 500 filaments, still more preferably from about 40 filaments to about 240 filaments and most preferably from about 120 to about 240 filaments. Multifilament fibers are also often referred to in the art as filament bundles or a bundle of filaments. As used herein, the term "yarn" is defined as a single strand consisting of multiple filaments and is used interchangeably with "multifilament fiber." As used herein, the term "denier" is a unit of linear density equal to the mass in grams per 9000 meters of fiber/yarn or tape. In this regard, the fibers forming each fibrous ply may be of any suitable denier. For example, fibers may have a denier of from about 50 to about 5000, more preferably from about 200 to about 5000, still more preferably from about 200 to about 3000, still more preferably from about 200 to about 1000, and most preferably from about 200 to about 500. Like fibers, fibrous tapes may be fabricated from the exact same polymer types discussed above for fibers, because such tapes are formed by compressing and flattening such fibers. Accordingly, like fibers, the tapes may be of any suitable denier, preferably having a denier of from about 50 to about 30,000, more preferably from about 200 to about 10,000, still more preferably from about 650 to about 2000, and most preferably from about 800 to about 1500.

As used herein, an "array" describes an orderly side-by-side, coplanar parallel arrangement of fibers or tapes, and a "parallel array" describes an orderly parallel arrangement of fibers/tapes. Accordingly, each "ply" of this disclosure (also referred to as a "single-ply" of unidirectionally oriented fibers/tapes) comprises an arrangement of substantially non-overlapping fibers or tapes that are aligned in a unidirectional (uniaxial), substantially parallel array. This type of fiber/tape arrangement is also known in the art as a "uni-tape", "unidirectional tape", "UD" or "UDT." Each individual ply has both an outer top/front surface and an outer bottom/rear surface. The term "composite" in the context of this disclosure refers to combinations of fibers or tapes with at least one polymeric binder material and also includes combinations of multiple fibrous plies.

The first elongate body ply 12 preferably comprises a plurality of first fibers that are high tensile strength (i.e., high tenacity), high tensile modulus polymeric fibers and/or a plurality of high tensile strength, high tensile modulus fibrous tapes. As used herein, a "high tensile strength, high tensile modulus" fiber or tape is one which has a preferred tenacity of at least about 7 g/denier or more, a preferred tensile modulus of at least about 150 g/denier or more, and preferably an energy-to-break of at least about 8 J/g or more, each as measured by ASTM D2256 for fibers and ASTM D882 (or another suitable method as determined by one skilled in the art) for tapes. The high tensile strength fibers preferably have a tenacity of greater than 10 g/denier, more preferably at least about 15 g/denier, still more preferably at least about 20 g/denier, still more preferably at least about 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier. Useful tapes are preferably "high tensile strength" tapes having a tenacity of at least 10 g/denier, an initial tensile modulus of at least about 150 g/denier or more, and an energy-to-break of at least about 8 J/g or more, each as measured by ASTM D882-09 at 10 inch (25.4 cm) gauge length and at an extension rate of 100%/min. High tensile strength tapes useful for forming the first elongate body ply 12 preferably have a tenacity of greater than 10 g/denier, more preferably at least about 15 g/denier, still more preferably at least about 20 g/denier, still more preferably at least about 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier, each as measured by ASTM D882-09 at 10 inch (25.4 cm) gauge length and at an extension rate of 100%/min. Regarding these properties, as used herein, the term "tenacity" refers to the tensile stress expressed as force (grams) per unit linear density (denier) of an unstressed specimen. The "initial modulus" of a fiber or tape is the property of a material representative of its resistance to deformation. The term "tensile modulus" refers to the ratio of the change in tenacity, expressed in grams-force per denier (g/d) to the change in strain, expressed as a fraction of the original fiber or tape length (in/in). Fibers (or tapes) forming the first elongate body ply 12 also preferably have lower deniers than the second elongate body ply 14, preferably being formed from fibers having a denier of less than 1000, more preferably from about 50 to about 1000 or 200 to 1000, and most preferably from about 50 to about 200 or about 200 to about 500.

Suitable elongate bodies for the fabrication of first elongate body ply 12 are high tenacity fibers including polyolefin fibers, such as high molecular weight polyethylene fibers, particularly ultra-high molecular weight polyethylene fibers, and polypropylene fibers, high tenacity para-aramid fibers, polybenzoxazole (PBO) fibers, polybenzothiazole (PBT) fibers, liquid crystal copolyester fibers, rigid rod fibers such as M5® fibers, and high tenacity glass fibers, as well as tapes formed from such fibers. Also suitable for producing polymeric fibers/tapes are copolymers, block polymers and blends of the above materials. The most preferred fiber types for forming first elongate body ply 12 are extended chain polyethylene fibers. Preferred are extended chain polyethylenes having molecular weights of at least 300,000, preferably ultra-high molecular weight polyethylenes (UHMWPEs) having molecular weights of at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668 and 8,444,898, all of which are incorporated herein by reference. Particularly preferred fiber types are any of the polyethylene fibers sold under the trademark SPECTRA® from Honeywell International Inc. of Morris Plains, N.J. SPECTRA® fibers are well known in the art.

Particularly preferred methods for forming UHMW PE fibers are processes that are capable of producing UHMW PE fibers having tenacities of at least 39 g/denier, most preferably where the fibers are multi-filament fibers. The most preferred processes include those described in commonly-owned U.S. Pat. Nos. 7,846,363; 8,361,366; 8,444, 898; 8,747,715; and 9,365,953, the disclosures of which are incorporated by reference herein to the extent consistent herewith. Such processes are called "gel spinning" processes, also referred to as "solution spinning," wherein a solution of ultra-high molecular weight polyethylene and a solvent is formed, followed by extruding the solution through a multi-orifice spinneret to form solution filaments, cooling the solution filaments into gel filaments, and extracting the solvent to form dry filaments. These dry filaments are grouped into bundles which are referred to in the art as either fibers or yarns. The fibers/yarns are then stretched (drawn) up to a maximum drawing capacity to increase their tenacity.

Preferred aramid (aromatic polyamide) fibers are well known and commercially available, and are described, for example, in U.S. Pat. No. 3,671,542. For example, useful aramid filaments are produced commercially by DuPont under the trademark of KEVLAR®, particularly high modulus aramid fibers having a tensile modulus greater than 100 GPa, such as KEVLAR® K49 and K149 aramid fibers and the like, particularly those having a tensile modulus greater than or equal to 105 GPa, greater than or equal to 125 GPa, or greater than or equal to 145 GPa. Also useful herein are poly(m-phenylene isophthalamide) fibers produced commercially by DuPont of Wilmington, Del. under the trademark NOMEX® and fibers produced commercially by Teijin Aramid Gmbh of Germany under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia. Preferred aramid fibers have a tensile modulus of from about 60 GPa to about 145 GPa and most preferably from about 90 GPa to about 135 GPa.

Suitable PBO fibers are commercially available and are disclosed for example in U.S. Pat. Nos. 5,286,833, 5,296,185, 5,356,584, 5,534,205 and 6,040,050, each of which is incorporated herein by reference. Suitable liquid crystal copolyester fibers are commercially available and are disclosed, for example, in U.S. Pat. Nos. 3,975,487; 4,118,372 and 4,161,470, each of which is incorporated herein by reference, and including VECTRAN® liquid crystal copolyester fibers commercially available from Kuraray Co., Ltd. of Tokyo, Japan. Suitable high tenacity glass fibers include high tenacity electric grade fiberglass (E-glass; low alkali borosilicate glass with good electrical properties) and structural grade fiberglass (S-glass; a high strength magnesia-alumina-silicate). Suitable polypropylene fibers include highly oriented extended chain polypropylene (ECPP) fibers as described in U.S. Pat. No. 4,413,110, which is incorporated herein by reference. Also useful are high tenacity electric grade fiberglass (E-glass; low alkali borosilicate glass with good electrical properties) and structural grade fiberglass (S-glass; a high strength magnesia-alumina-silicate). M5® fibers are formed from pyridobisimidazole-2,6-diyl (2,5-dihydroxy-p-phenylene) and were most recently manufactured by Magellan Systems International of Richmond, Va. and are described, for example, in U.S. Pat. Nos. 5,674,969, 5,939,553, 5,945,537, and 6,040,478, each of which is incorporated herein by reference. The term "rigid rod" fibers is not limited to such pyridobisimidazole-based fiber types, and many PBO and aramid fiber varieties are often referred to as rigid rod fibers.

Similar to the first elongate body ply 12, the second elongate body ply 14 may also be fabricated from fibers, fibrous tapes or a combination thereof. Suitable second fibers for the fabrication of second elongate body ply 14 include carbon fibers, glass fibers including electric grade fiberglass (E-glass; low alkali boro silicate glass with good electrical properties), structural grade fiberglass (S-glass; a high strength magnesia-alumina-silicate) and resistance grade fiberglass (R-glass; a high strength alumino silicate glass without magnesium oxide or calcium oxide), aramid fibers (para-aramid and meta-aramid fibers), polyester fibers such as polyethylene terephthalate and polyethylene naphthalate fibers, and combinations thereof. Each of these fiber types and methods for their manufacture are well known. Carbon fibers are commercially available, for example, from Kureha Corporation of Japan under the trademark KRECA®; from CYTEC Industries Inc. of West Paterson, N.J. under the trademark THORNEL®; from Nippon Carbon Co. Ltd. of Tokyo, Japan, and from Toray Composite Materials America of Tacoma, Wash., such as their T700 fibers. Carbon fibers are spun by standard methods for polyacrylonitrile (PAN)-based fibers. First polyacrylonitrile is melt spun into fibers, and then the fibers are pyrolized into graphitic carbon fibers. Particular methods of their manufacture are described, for example, in U.S. Pat. Nos. 4,115,527, 4,197,283, 4,356,158 and 4,913,889, the disclosures of which are incorporated herein by reference. Preferred carbon fibers have a tensile modulus of from about 137 GPa to about 827 GPa; more preferably from about 158 GPa to about 517 GPa and most preferably from about 206 GPa to about 276 GPa.

Glass fibers are conventionally known in the art and are commercially available, for example, from PPG Industries of Pittsburgh, Pa., and Nippon Electric Glass Co., Ltd. Japan. See, for example, U.S. Pat. Nos. 4,015,994, 4,140,533, 4,762,809, 5,064,785, 5,258,227, 5,284,807, 6,139,958, 6,890,650, 6,949,289, etc., the disclosures of which are incorporated herein by reference. Also known are S2-Glass® S-glass fibers commercially available from AGY Holding Corp. of Aiken, S.C. as well as E-glass fibers from AGY Holding Corp., HiPerTex™ E-Glass fibers, commercially available from 3B Fibreglass of Battice, Belgium, and VETROTEX® R-glass fibers from Saint-Gobain of Courbevoie, France. Preferred glass fibers have a tensile modulus of from about 60 GPa to about 90 GPa. Polyester fibers are commercially available from Performance Fibers of Richmond, Va. See, for example, U.S. Pat. Nos. 5,277,858; 5,397,527; 5,403,659; 5,630,976; 6,403,006; 6,649,263 and 6,828,021, the disclosures of which are incorporated herein by reference. Preferred polyester fibers have a tensile modulus of from about 2 g/denier to about 10 g/denier; more preferably from about 3 g/denier to about 9 g/denier and most preferably from about 5 g/denier to about 8 g/denier.

Fibrous tapes useful in the fabrication of either the first elongate body ply 12 or the second elongate body ply 14 are formed by conventionally known methods. In this regard, the term "tape" refers to a flat, narrow, monolithic strip of material having a length greater than its width and an average cross-sectional aspect ratio, i.e. the ratio of the greatest to the smallest dimension of cross-sections averaged over the length of the tape article, of at least about 3:1. A fibrous tape refers to a tape that comprises one or more filaments. The cross-section of a tape of this disclosure may be rectangular, oval, polygonal, irregular, or of any shape satisfying the width, thickness and aspect ratio requirements outlined herein. Such tapes preferably have a substantially rectangular cross-section with a thickness of about 0.5 mm or less, more preferably about 0.25 mm or less, still more preferably about 0.1 mm or less and still more preferably about 0.05 mm or less. In the most preferred embodiments, the polymeric tapes have a thickness of up to about 3 mils (76.2 μm), more preferably from about 0.35 mil (8.89 μm) to about 3 mils (76.2 μm), and most preferably from about 0.35 mil to about 1.5 mils (38.1 μm). Thickness is measured at the thickest region of the cross-section.

Tapes useful herein have preferred widths of from about 2.5 mm to about 50 mm, more preferably from about 5 mm to about 25.4 mm, even more preferably from about 5 mm to about 20 mm, and most preferably from about 5 mm to about 10 mm. These dimensions may vary but the tapes used herein are most preferably fabricated to have dimensions that achieve an average cross-sectional aspect ratio, i.e. the ratio of the greatest to the smallest dimension of cross-sections averaged over the length of the tape article, of greater than about 3:1, more preferably at least about 5:1, still more preferably at least about 10:1, still more preferably at least about 20:1, still more preferably at least about 50:1, still more preferably at least about 100:1, still more preferably at least about 250:1 and most preferred tapes have an average cross-sectional aspect ratio of at least about 400:1. When forming a fibrous ply from tapes, a plurality of tapes are arranged side-by-side, substantially coextensively in coplanar fashion to form a wide layer having preferred dimensions as described above.

Suitable tapes are most preferably formed by compressing fibers that are fabricated from the exact same polymer types discussed above for fibers, because such tapes are formed by compressing and flattening such fibers. Such methods are described, for example, in commonly-owned U.S. Pat. Nos. 8,263,119; 8,697,220; 8,685,519; 8,852,714; 8,906,485; 9,138,961 and 9,291,440, each of which is incorporated herein by reference to the extent consistent herewith. However, fibrous tapes formed from any method are useful, including tapes disclosed in U.S. Pat. No. 9,138,961 which is incorporated herein by reference to the extent consistent herewith. For example, a fabric may be cut or slit into tapes having a desired length. An example of a slitting apparatus is disclosed in U.S. Pat. No. 6,098,510 which teaches an apparatus for slitting a sheet material web as it is wound onto said roll. Another example of a slitting apparatus is disclosed in U.S. Pat. No. 6,148,871, which teaches an apparatus for slitting a sheet of a polymeric film into a plurality of film strips with a plurality of blades. The disclosures of both U.S. Pat. Nos. 6,098,510 and 6,148,871 are incorporated herein by reference to the extent consistent herewith.

Each of the unidirectional elongate body plies 12 and 14 may be fabricated according to conventional methods in the art. In a preferred method of forming a non-woven unidirectional fibrous ply, a plurality of fibers are arranged into an array, typically being arranged as a fiber/tape web comprising a plurality of fibers/tapes aligned side-by-side in a substantially parallel, unidirectional array. In a typical process, fibers (filament bundles) are supplied from a creel and led through guides and one or more spreader bars into a collimating comb to form the web. The spreader bars and collimating comb disperse and spread out the bundled filaments, reorganizing them side-by-side in a coplanar fashion into a substantially parallel, unidirectional array. Ideal fiber spreading results in the individual filaments or individual fibers being positioned next to one another in a single fiber plane, forming a substantially unidirectional, parallel array of fibers without fibers overlapping each other. This is typically followed by coating the fibers with a polymeric binder material that holds the fibers/tapes together in the web form.

Figure 3:
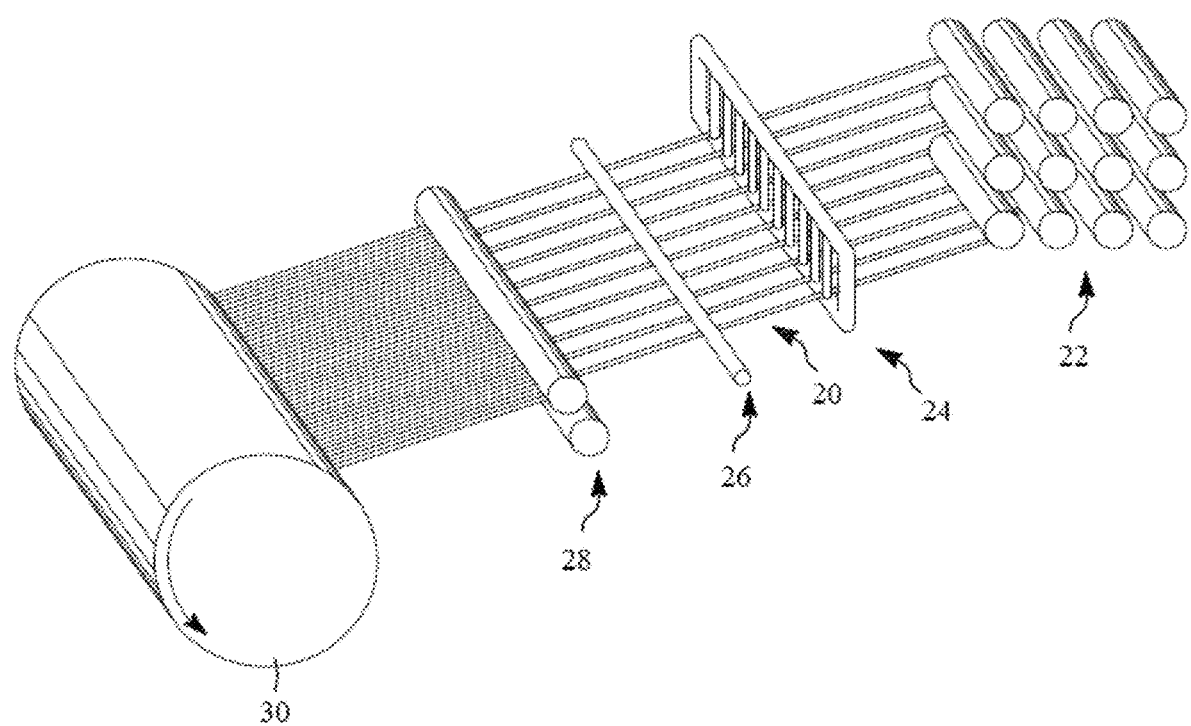
FIG. 3 is a top perspective view schematic representation of the formation of a unidirectional fibrous ply of the prior art having uniform areal density.

As illustrated in FIG. 3, in a conventional method for forming unidirectional fiber plies, a plurality of multi-filament fibers (i.e., filament bundles 20) are supplied from a creel 22 and arranged into a uniform or substantially uniform parallel array of fibers. Filament bundles 20 are passed through a heddle 24, the filament bundles 20 are typically (but optionally) passed through a binder/resin coater 26 whereby they are coated with a binder/resin that helps hold the filaments together in the bundle form. Thereafter, the filament bundles 20 are passed through a spreading apparatus 28 that will spread out the filaments of the filament bundles side-by-side in a coplanar fashion to form a continuous fiber web of parallel, unidirectional elongate bodies. In this regard, spreading apparatus 28 may comprise, for example, a pair of moving rolls, a pair of stationary rolls, a combination of a moving roll and stationary roll, or another apparatus as would be determined by one skilled in the art to be suitable for their needs. The continuous array of filaments 20 is then optionally rolled onto storage roll 30 for storage until needed for use. Although FIG. 3 illustrates the binder being applied by a coater 26 positioned between the heddle 24 and the spreading apparatus 28, the binder may alternatively be applied separately off-line, or may be applied in-line in the apparatus of FIG. 3 in a different location, such as after spreading apparatus 28 but before storage roll 30. Also, the apparatus illustrated in FIG. 3 is only exemplary and any other conventional apparatus may be used.

The width of a fiber array such as illustrated in FIG. 3, fabricated in the form of a continuous web, may be any width desired by the manufacturer. In this regard, the illustration of FIG. 3 is not drawn to scale and known heddles 24 generally may be customized to include any number of slots, with any slot dimensions as desired, allowing the filaments to be spread as thinly as desired and allowing the array to have any desired width. The number of bundles supplied to the heddle 24 from creel(s) 22 may be adjusted, as well as the number of filaments forming the bundles. In this regard, in the preferred embodiments, the array/web, and coincidingly the elongate body plies 12 and 14, will have a width of at least 10 inches (25.4 cm), more preferably a width of at least about 12 inches (30.48 cm), still more preferably a width of at least about 15 inches (38.1 cm), still more preferably a width of at least about 18 inches (45.72 cm), still more preferably a width of at least about 20 inches (50.8 cm), still more preferably a width of at least about 24 inches (60.96 cm), and most preferably a width of at least about 30 inches (76.2 cm). Similarly, the length of the elongate body plies may be adjusted as desired by cutting a desired length from the continuous web. In the preferred embodiments of the disclosure, a plurality of squares having the same dimensions in length and width are cut from continuous webs of different fibers to form each of the first elongate body ply 12 and the second elongate body ply 14.

Figure 4:
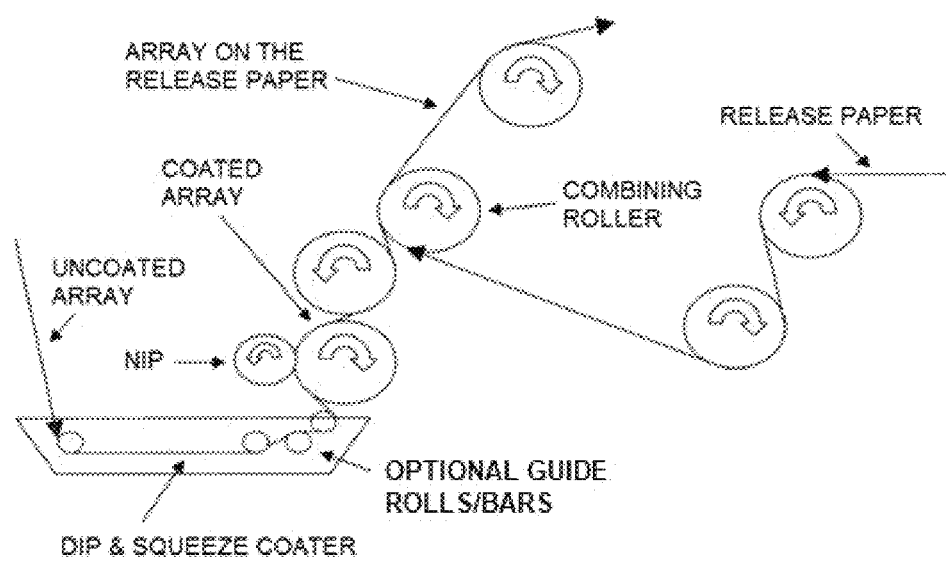
FIG. 4 is a schematic perspective view of an array being coated with a binder by passage through a dip coater followed by applying the coated array onto a release substrate.

FIG. 4 illustrates an alternative process of applying a polymeric binder to an already formed array of elongate bodies, wherein an array of bodies in the form of a continuous web is passed through a conventional dip and squeeze coater followed by applying the coated array onto a conventional release paper substrate. The coated array on the release paper may then be rolled up onto a storage roll for later use or may be immediately sent for further processing into elongate body plies of desired lengths. If the coated array on the release paper is to be stored, the binder coating is preferably dried/cured prior to storage. If the coated array on the release paper is to be immediately sent for further processing, such as to be laminated with another array of elongate bodies, then the binder coating (on one or both arrays) may remain wet so as to serve as a bonding adhesive between the plies, or the coatings may be dry and still have sufficient adhesive properties to bond the bodies to each other. Upon bonding of a coated array (or coated ply) on release paper to another array (or ply, coated or uncoated), the release papers are to be stripped and discarded after merging of the arrays, or the release paper may be stripped from cut fiber plies after lamination of the first elongate body ply 12 to the second elongate body ply 14. In this regard, it should be understood that a pre-cut ply may be laminated to a continuous elongate body web, followed by cutting the web to the desired length, and this is still considered to be the lamination of a first unidirectional elongate body ply onto a second unidirectional elongate body ply for the purposes of this disclosure. This method is particularly desirable when forming fibrous plies of very low total areal density, e.g., 80 g/m$^2$ or less, or 60 g/m$^2$ or less, or 40 g/m$^2$ or less, or 20 g/m$^2$ or less.

In addition to each of the first and second elongate body plies being fabricated from different fiber types, the plies also differ by the amount of polymeric binder/resin content and fiber areal density (FAD). The term "polymeric binder," also referred to in the art as a "polymeric matrix" material, is conventionally known in the art and describes a material that binds fibers/tapes together to secure them in place in the form a ply/layer, either by way of its inherent adhesive characteristics or after being subjected to well-known heat and/or pressure conditions. As used herein, a "polymeric" binder or matrix material includes resins and rubber. When such a binder is used in a fiber-based ply, the polymeric binder/matrix material either partially or substantially coats the individual fibers, preferably substantially coating each of the individual filaments/fibers forming a fiber ply, or fully encapsulating each of the individual filaments/fibers forming a fiber ply. When such a binder is used in a tape-based layer, it is not necessary for the binder to substantially coat all surfaces of the tapes or encapsulate the tapes, because the method used to make the tapes (which usually involves a compression step and fusing of the filaments to each other) satisfactorily holds the filaments forming the individual tapes together. In this regard, the primary purpose of the binder/resin in a tape-based fibrous ply is to hold the tapes together side-by-side in ply/layer form.

Suitable polymeric binder materials include both low tensile modulus, elastomeric materials and high tensile modulus materials, although low modulus thermoplastic binders are most preferred for the fabric layers of the stab resistant panel in order to maximize flexibility. As used herein throughout, the term tensile modulus means the modulus of elasticity, which for polymeric binder materials is measured by ASTM D638. A low or high modulus binder may comprise a variety of polymeric and non-polymeric materials. For the purposes of this disclosure, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, still more preferably 1200 psi (8.23 MPa) or less, and most preferably is about 500 psi (3.45 MPa) or less. The glass transition temperature (T$_g$) of the low modulus elastomeric material is preferably less than about 0° C., more preferably the less than about –40° C., and most preferably less than about –50° C. The low modulus elastomeric material also has a preferred elongation to break of at least about 50%, more preferably at least about 100% and most preferably at least about 300%. Whether a low modulus material or a high modulus material, in addition to the colorant, the polymeric binder may also include fillers such as carbon black or silica, may be extended with oils, or may be vulcanized by sulfur, peroxide, metal oxide or radiation cure systems as is well known in the art.

A wide variety of materials and formulations may be utilized as a low modulus polymeric binder. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also useful are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type (AB)$_n$ (n=2-10) or radial configuration copolymers of the type R-(BA)$_x$ (x=3-150); wherein A is a block from a polyvinyl aromatic monomer and B is a block from a conjugated diene elastomer. Many of these polymers are produced commercially by Kraton Polymers of Houston, Tex., including low modulus polystyrene-polyisoprene-polystyrene block copolymers sold under their trademark KRATON®. Also useful are resin dispersions of styrene-isoprene-styrene (SIS) block copolymer sold under the trademark PRINLIN® and commercially available from Henkel Technologies, based in Dusseldorf, Germany.

High modulus, rigid materials generally have an initial tensile modulus greater than 6,000 psi, typically possessing a high tensile modulus when cured of at least about 1×10$^6$ psi (6895 MPa) as measured by ASTM D638. Useful high modulus, rigid polymeric binder materials include thermoplastic as well as thermosetting polymers, including polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. Also useful is a thermosetting polymer that is soluble in carbon-carbon saturated solvents such as methyl ethyl ketone. Also useful are the binder materials described in U.S. Pat. No. 6,642,159, the disclosure of which is incorporated herein by reference.

Also useful as binder polymers are polar resins or polar polymers, particularly polyurethanes within the range of both soft and rigid materials at a tensile modulus ranging from about 2,000 psi (13.79 MPa) to about 8,000 psi (55.16 MPa). Preferred polyurethanes are applied as non-aqueous polyurethane dispersions that are most preferably, but not necessarily, cosolvent free. Such includes anionic polyurethane dispersions, cationic polyurethane dispersions and nonionic polyurethane dispersions. Particularly preferred polyurethanes are non-aqueous anionic polyurethane dispersions; non-aqueous aliphatic polyurethane dispersions, and most preferred are non-aqueous anionic, aliphatic polyurethane dispersions. Such includes anionic polyester-based polyurethane dispersions; aliphatic polyester-based polyurethane dispersions; and anionic, aliphatic polyester-based polyurethane dispersions, all of which are preferably non-aqueous, cosolvent free dispersions. Such also includes non-aqueous anionic polyether polyurethane dispersions; non-aqueous aliphatic polyether-based polyurethane dispersions; and non-aqueous anionic, aliphatic polyether-based polyurethane dispersions. Similarly preferred are all corresponding variations (polyester-based; aliphatic polyester-based; polyether-based; aliphatic polyether-based, etc.) of non-aqueous cationic and non-aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

The fibrous plies are fabricated such that the first elongate body ply 12 has a greater binder content than the second elongate body ply 14. In the preferred embodiments, the first polymeric binder material of the first elongate body ply 12 comprises from about 30% to about 49.9% by weight of a polymeric binder, more preferably from about 30% to about 45%, and most preferably from about 30% to about 40% by weight of the fibers plus the weight of the binder. In the preferred embodiments, the second polymeric binder material of the second elongate body ply 14 comprises from about 20% to about 40% by weight of a polymeric binder, more preferably from about 20% to about 35%, and most preferably from about 20% to about 30% by weight of the fibers plus the weight of the binder. Together, the first polymeric binder material and the second polymeric binder material combined comprise at least 30% by weight of the composite material, preferably from about 30% to about 45% by weight of the fibers plus the weight of the binder. Control of the binder content is achieved by those skilled in the art using conventional methods, for example by adjusting factors such as the solids content in the polymeric binder composition being applied to the fibers/fibrous plies/fibrous webs, the rate that the fibers are passed through a coating bath such as in the embodiments of FIG. 3 and FIG. 4, or by adjusting the amount of composition applied to the fibers/filament bundles using any other well-known coating method, such as by modifying the thickness/areal weight of the adhesive when applied in the form of a film, such as an epoxy film such as used in the Examples.

Additionally, the first polymeric binder material and the second polymeric binder material preferably comprise chemically different polymers. For example, one binder may be a thermosetting polymer/resin such as an epoxy or a thermosetting polyurethane polymer with the other being a thermoplastic copolymer/resin, such as a thermoplastic polyurethane, or the first and second polymeric binder materials may be two different thermosetting polymers, such as a thermosetting epoxy and a thermosetting polyurethane, or two different thermoplastic polymers, such as two different thermoplastic polyurethanes. In a preferred embodiment, a carbon fiber-based fibrous ply (e.g., non-woven, unidirectional carbon fiber fabric having an areal density of greater than 100 grams/m², preferably 120 g/m² or greater) that is coated or impregnated with a high modulus thermoplastic polyurethane (i.e., having a modulus greater than 6,000 psi, preferably greater than 10,000 psi,) is attached to an E-glass fiber-based fibrous ply (e.g., non-woven, unidirectional carbon fiber fabric having an areal density of less than 20 grams/m², preferably less than 15 g/m²) that is coated or impregnated with a highly elongated epoxy or thermosetting polyurethane binder resin (i.e., having an elongation of 15% or more, preferably 30% or more, still more preferably 40% or more), preferably wherein highly elongated resin is cross-linked during curing.

Figure 6:
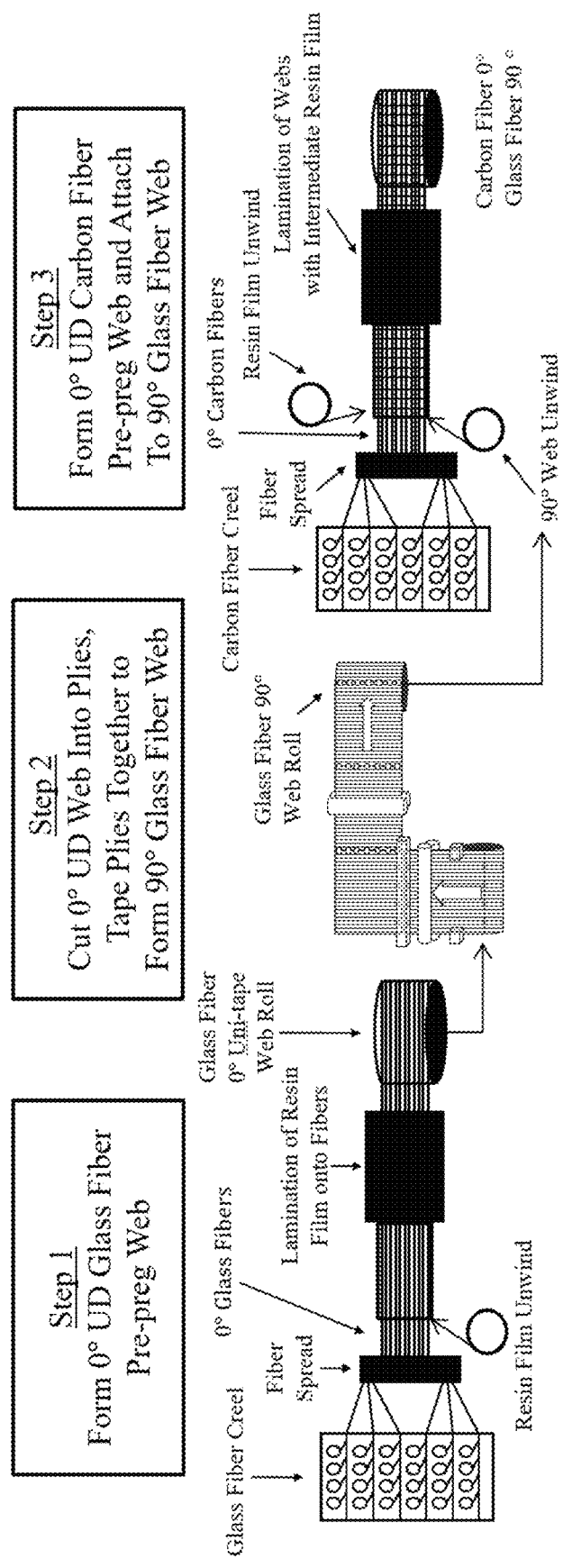
FIG. 6 is a schematic perspective view of the fabrication of a 0°/90° hybrid composite from a 0° web of carbon fibers and a 90° web of glass fibers.

Methods for applying a polymeric binder material to fiber-based plies, wherein the fiber-based plies are impregnated with the binder, are well known and readily determined by one skilled in the art. The term "impregnated" is considered herein as being synonymous with "embedded," "coated," or otherwise applied with a polymeric coating where the polymeric material diffuses into the fabric ply and is not simply on a surface of the ply. Any appropriate application method may be utilized to apply the polymeric binder material and particular use of a term such as "coated" is not intended to limit the method by which it is applied onto the filaments/fibers. Useful methods include, for example, spraying, extruding or roll coating polymers or polymer solutions onto the fibers, as well as transporting the fibers through a molten polymer or polymer solution. Most preferred are methods that substantially coat or encapsulate each of the individual fibers and cover all or substantially all of the fiber surface area with the polymeric binder material, including the dip and squeeze method illustrated in FIG. 4. These coating methods are also generally useful for coating tape-based fabric layers with a binder, but as lower quantities are preferred as discussed above, methods such as spraying or roll coating are preferred over methods such as transporting the tapes through a molten polymer or polymer solution. Additionally, each polymeric binder material may be applied to the fibers (e.g., of each fibrous ply/fabric) in the form of a film. As schematically illustrated in FIG. 6, the polymeric binder material may optionally be supplied on a surface of a release paper wherein the polymeric binder is then transferred from the release paper onto the fibers, followed by stripping away the release paper. This binder application method is conventionally known in the art and is particularly preferred method of applying an epoxy binder, such as illustrated in the embodiment of FIG. 6.

Accordingly, in the preferred embodiments of this disclosure, the plies will have a fiber component (including the tapes, which are either compressed fibers, narrow fabric strips cut from a larger fabric, narrow woven strips, etc., as described in incorporated U.S. Pat. No. 9,138,961) and a binder/resin component. Together, the mass per unit area of the combined fiber and binder components is referred to in the art as the "areal density" or "total areal density." The total areal density (TAD) of a composite may be determined by ASTM D3776. The fiber portion of the TAD is known in the art as the fiber areal density, or FAD. The FAD is determined from the TAD based on the known proportions of fiber to binder/resin portion of the composite weight (e.g., for a composite having a TAD of 100 grams/m² that includes 30% binder/resin by weight, the FAD is 70 grams/m²). The weight % of binder/resin is determined by conventional means, such as weighing or calculating the weight of the fibers before coating and the weight of the composite after coating with the binder/resin. These FAD and binder/resin content values may be controlled as desired, for example, by controlling the number of fibers (filament bundles) (and the number of filaments incorporated in the bundles) mounted on a creel (see FIG. 3) for inclusion in the fiber ply. In accordance with the preferred objectives of this disclosure, the second elongate body ply 14 has a fiber areal density of at least three times (3×) the fiber areal density of the first elongate body ply 12, more preferably at least four times (4×) the fiber areal density of the first elongate body ply 12 and most preferably at least five times (5×) the fiber areal density of the first elongate body ply 12. In this regard, the first fibrous ply has a fiber areal density of 20 grams/m² (g/m²) or less and the second fibrous ply has a fiber areal density of at least 60 g/m². Preferably, the first fibrous ply has a fiber areal density of from about 5 g/m² to 20 g/m² and the second fibrous ply has a fiber areal density of from 60 g/m² to 120 g/m². Preferably, the first fibrous ply has a total areal density of less than 100 g/m², more preferably less than 50 g/m², and still more preferably from about 5 g/m² to 20 g/m², most preferably having a total areal density of less than 15 g/m2. In the preferred embodiment the second fibrous ply has a total areal density of greater than 100 g/m², more preferably from 100 g/m² to about 150 g/m², and most preferably from about 100 g/m² to 125 g/m². Individually, the areal density of each of the plies is preferably uniform or substantially uniform across its entire width. The composite material combining the first and second fibrous plies has a fiber areal density of at least about 80 g/m², preferably from about 80 g/m² to about 125 g/m², more preferably from about 80 g/m² to about 115 g/m² and most preferably from about 80 g/m² to about 100 g/m². Further, the composite material combining the first and second fibrous plies has a total areal density of at least about 125 g/m², preferably from about 125 g/m² to about 200 g/m², more preferably from about 125 g/m² to about 175 g/m² and most preferably from about 125 g/m² to about 150 g/m². In the preferred embodiments of this disclosure, the total areal density of the second unidirectional fibrous ply is greater than 50% of the total combined areal density of the first unidirectional fibrous ply and the second unidirectional fibrous ply.

Once formed, the two fibrous plies adjoined (i.e., stacked on each other surface-to-surface in a substantially coextensive fashion) and are consolidated (merged) together to form a single layer, unitary hybrid ply. By "consolidating" it is meant that the polymeric binder material together with each fibrous ply are combined and merged into a single unitary layer. When used herein, a "single layer" or "single unitary layer" structure refers to a monolithic composite structure composed of one or more individual plies that have been united, wherein multiple individual plies are no longer separable without being damaged or destroyed. Methods of consolidating fibrous plies/layers are well known, such as by the methods described in U.S. Pat. No. 6,642,159 (which is incorporated herein by reference to the extent consistent herewith), and consolidation can occur via drying, cooling, heating, pressure or a combination thereof. Heat and/or pressure may not be necessary, as the fibers or fabric plies/layers may just be glued together, as is the case in a wet lamination process. However, consolidation is preferably performed by low pressure lamination or by high pressure molding, with low pressure lamination being preferred.

Normally such lamination is conducted in a flat-bed laminator, in a double belt or steel belt press or in a calendar nip set, although other methods may be used as desired by one skilled in the art. Consolidation may also be conducted by vacuum molding the material in a mold that is placed under a vacuum. Vacuum molding technology is well known in the art. Lamination may be performed, for example, at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. In this regard, low lamination pressures of below 350 psi (2.4 MPa), at temperatures of from about 225° F. (107.22° C.) to about 275° F. (135° C.). Short lamination times of below about 60 seconds are most preferred.

High pressure merging of the fibrous may be achieved by molding under heat and pressure in a suitable molding apparatus at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred high pressure molding temperatures range from about 200° F. (−93° C.) to about 350° F. (−177° C.), more preferably at a temperature from about 200° F. to about 300° F. and most preferably at a temperature from about 200° F. to about 280° F. The pressure under which the fibrous plies are molded has a direct effect on the stiffness or flexibility of the resulting molded product. Particularly, the higher the pressure at which they are molded, the higher the stiffness, and vice-versa. As good flexibility is desired so that the composite can be wrapped around a mandrel into a tubular form, the milder low pressure consolidation/lamination techniques are most preferred.

Figure 2:
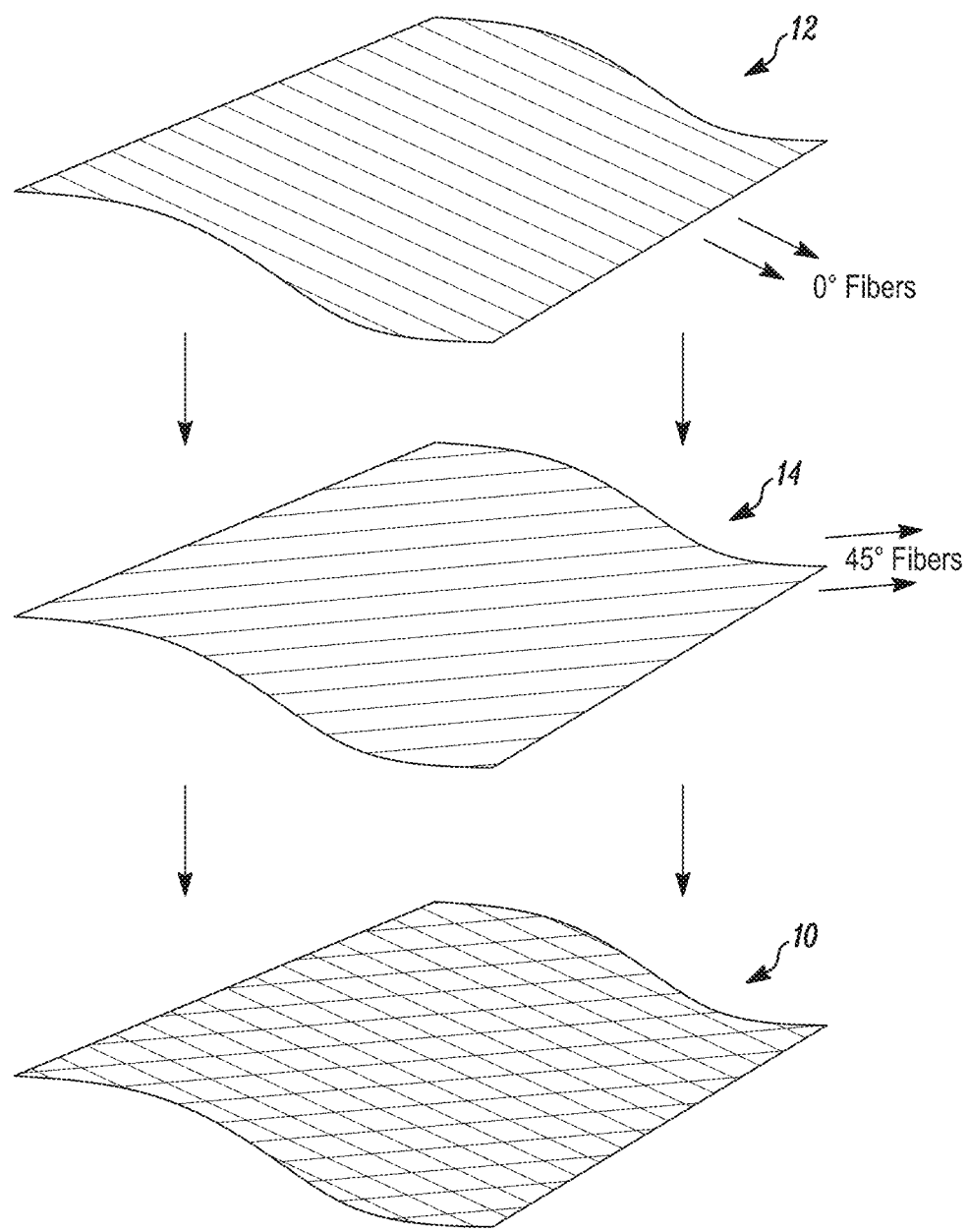
FIG. 2 is a side perspective view schematic representation illustrating the formation of a hybrid composite joining a unidirectional first fibrous ply having fibers oriented at 0° with a unidirectional second fibrous ply having fibers oriented at 45° second fibrous ply.

As illustrated in FIG. 2, the first elongate body ply 12 and second elongate body ply 14 are consolidated to form a single layer, 2-ply, unitary hybrid composite 10 wherein the elongate bodies of the two consolidated plies are oriented in different directions. While it is conventionally known in the art of ballistic resistant composites to cross-ply multiple non-woven fibrous plies such that the fibers/tapes are perpendicular to each other at 0°/90°, that is for the purpose of maximizing the ability of a composite to stop the penetration of a projectile, not to maximize resistance to circumferential stress in a hollow tubular structure. To maximize resistance to circumferential stress as desired herein, beneficial results are achieved when one of the fibrous plies is arranged so that its component elongate bodies are oriented at 0°, i.e., along the longitudinal axis of the tubular structure, while the elongate bodies of the other ply are oriented at an angle of from 20° to about 70° relative to the said 0° ply. More preferably, one of the fibrous plies is arranged with the fibers at 0° along the longitudinal axis of the tubular structure, with the elongate bodies of the other ply being oriented at an angle of from 30° to about 60° relative to the said 0° ply, most preferably being oriented on a bias at 45° relative to the 0° ply. As illustrated in FIG. 2, in the most preferred embodiments, the first elongate body ply 12 is positioned so that its component fibers are oriented at 0° along the longitudinal axis of the hollow tubular structure, while the second elongate body ply 14 is positioned with its fibers at a bias (e.g., 45° as illustrated) to elongate body ply 12, or the orientations of first elongate body ply 12 and elongate body ply 14 may be reversed.

Once the composite 10 is formed, the hollow tubular structures are formed by conventional methods in the art, most preferably by wrapping the composite 10 around a cylindrical or tapered mandrel by either roll wrapping or helical wrapping techniques. An exemplary roll wrapping technique is illustrated in FIG. 1 wherein the composite 10 is wrapped around itself, as many times as desired to form a multi-layer tube having a desired wall thickness. The multi-layer tube is then heated and subjected to pressure in order to crosslink the resin and merge the wrapped layers together, thereby forming them into a unitary tubular article, and the resultant tubular article is then removed from the mandrel. In this regard, the composite on the mandrel may be heated for between about 2 to about 24 hours at a temperature of from about 220° F. to 280° F. (about 104° C. to 138° C.), more preferably for between about 4 hours to about 8 hours at a temperature of from about 220° F. to about 240° F. (about 104° C. to about 116° C.), and with an applied pressure of from about 100 psi to about 150 psi (about 689 kPa to about 1033.5 kPa).

Figure 5:
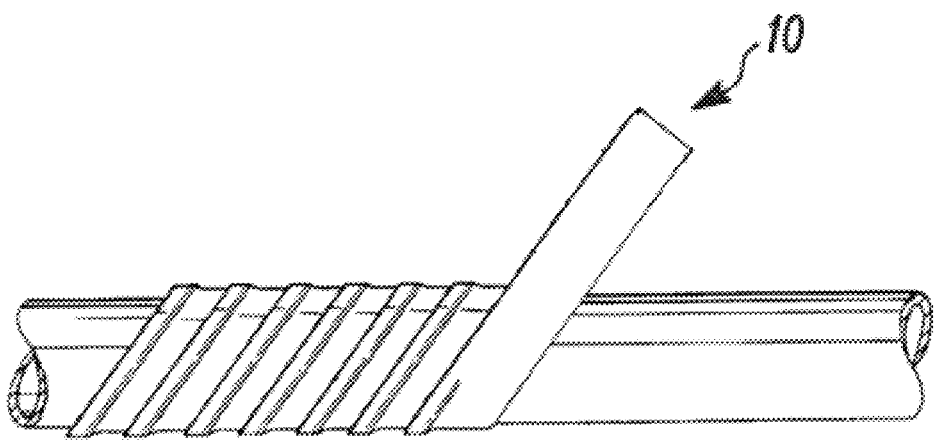
FIG. 5 is a side perspective view schematic representation of a hybrid composite being helically wrapped around a mandrel to form a tubular structure.

An exemplary helical wrapping technique is illustrated in FIG. 5 wherein a layer of the composite 10 is wrapped around a cylindrical mandrel at an angle. In this method, the composite 10 is cut into narrow widths, helically wound onto a mandrel and then cured under suitable heat and preferably pressure. The strips of "narrow" width cut from the composite preferably have a width of from about 1 inch to about 20 inches (2.54 cm to 50.8 cm), more preferably from about 2 inches to about 16 inches (5.08 cm to 40.64 cm), and most preferably from about 4 inches to about 16 inches (10.16 cm to 40.64 cm). Smaller diameter tubular structures are generally formed from narrower fabric composites and wrapped around smaller mandrels compared to larger diameter tubular structure. Similar to roll wrapping, the wrapped composite on the mandrel may be heated for between about 2 to about 24 hours at a temperature of from about 220° F. to 280° F. (about 104° C. to 138° C.), more preferably for between about 4 hours to about 8 hours at a temperature of from about 220° F. to about 240° F. (about 104° C. to about 116° C.). The pressure may range from about 100 psi to about 150 psi (about 689 kPa to about 1033.5 kPa). The resulting tube is then removed from the mandrel.

When winding the composite strips over the mandrel, each successive warp layer may overlap the previous wrap layer by a desired amount, such as, for example, from about 15% to about 75% of the width of the previous strip, more preferably about one-half of the width of the previous strip. It should be understood that other overlapping distances or no overlap may also be employed. When helically winding the composite fabric, a winding angle of from about 40° to about 60° is preferred, with a winding angle of from about 55° to about 60° being most preferred for maximizing resistance to hoop stress. To achieve further strength in the tubular structure, the composite may initially be wound on the mandrel in one direction to form a first layer and then overlapped over that first layer to add a second layer by winding the composite in the opposite direction.

Depending on the wrapping method used, the thus formed tubular article may have a uniform areal density along its entire length or may have a non-uniform areal density along its entire length. In this regard, the roll wrapping method will produce tubular articles having a uniform areal density, while the helical wrapping method may produce tubular articles having either uniform or non-uniform areal densities depending on if there is any overlap of wound strips as discussed above. Preferably, the areal density of the tubular article is uniform along its entire length. Depending on the method used, the resulting tubular articles may also be characterized by alternating areas of high polymeric binder material concentration and areas of low polymeric binder material concentration. This is particularly achieved when roll wrapping a composite comprising a first fibrous ply having a different binder content than the second fibrous ply. In another embodiment, particularly when the tubular articles are formed by wrapping the composite around the mandrel so that it is overlapped onto and sealed to itself by subjecting the wrapped structure to heat and pressure, the heat and pressure conditions may cause a portion of the first polymeric binder material from the first fibrous ply to penetrates into the second fibrous ply, or vice/versa, thereby producing a unitary tubular articles wherein the overlapping layers are fused to each other and having maximized strength uniformity along the entire length of the tubular article.

The resultant tubular structure may be employed in a variety of applications, including weight bearing supports such as tent supports and bicycle frames, or in articles that are subjected to significant cylindrical stress, such as fishing rods, golf clubs, ski poles, etc. Another use for the tubular structures of this disclosure is as a covering or liner for existing pipe or hose. Such pipe may be formed of metal, plastic or composite.

In the preferred embodiments, the as-formed tubular articles are thin walled. Accordingly, the thickness of the tubular articles will depend on the thickness of the 2-ply composite layer 10 and the number of windings around the mandrel. In this regard, the 2-ply composite layer 10 will have a thickness of from about 12 μm to about 600 μm, more preferably from about 50 μm to about 385 μm, still more preferably from about 50 μm to about 255 μm, and most preferably from about 50 μm to about 200 μm. The preferred wall thicknesses will vary depending on the desired end use of the tubular articles. However, generally, the tubular articles will have a preferred wall thickness of from about 0.13 mm to about 50.0 mm, more preferably from about 0.13 mm to about 25 mm, still more preferably from about 0.13 mm to 19.00 mm, still more preferably from about 0.13 mm to 12.7 mm, still more preferably from about 0.25 mm to 3.20 mm, and most preferably from about 0.38 mm to about 1.0 mm. Additionally, the diameter of the tubes will also depend on the size of the mandrel around which the composite 10 is wrapped, which determines the diameter of the hollow core of the tubular articles. Such would be readily determined by the end user, but for the purposes of the preferred embodiments of this disclosure, it is intended that the hollow core of the tubular articles will typically range from about 0.1 mm to about 250 mm, more preferably from about 0.1 mm to about 100 mm and most preferably from about 0.38 mm to about 50 mm.

While the present technology has been particularly shown and described with reference to preferred embodiments, it will be readily appreciated by those of ordinary skill in the art that various changes and modifications may be made without departing from the spirit and scope of the disclosure. For example, rather than forming the 2-ply composites by first forming each fibrous ply and then stacking them on each other coextensively, surface-to-surface, followed by merging them together such as by lamination, an alternate composite fabrication method such as the one illustrated in FIG. 6 may be used where one of the fibrous layer types is first formed into a unidirectional fibrous web with the fibers of the web being oriented axially at 0° (such as described in greater detail above, such as in a method illustrated in FIG. 3) followed by converting that web of axially oriented fibers into web of fibers oriented at 90° (or any other desired angle, e.g., ±45°) by cutting the 0° web into sections, rotating the cut sections so that the fibers are oriented in the desired angle, and then taping the cut sections together to form a new web such as shown in FIG. 6. This new web, e.g., a 90° web as illustrated in FIG. 6, may then be adjoined with another 0° unidirectional web, preferably with an intermediate adhesive such as an adhesive film (such as an epoxy film) or using a polymeric binder coating on the fibers as an adhesive, followed by consolidating the two plies together such as by conventional lamination techniques, such as those described above. It is intended that the claims be interpreted to cover the disclosed embodiment, those alternatives which have been discussed above and all equivalents thereto.

The following non-limiting Examples serve to illustrate the preferred embodiments of this disclosure.

EXAMPLES

Two sets of hybrid pre-pregs were made for fabricating several hollow tubes, some having uniform diameters along their full length and others being tapered tubes with non-uniform diameters along their lengths. Each tube was fabricated by first making the desired pre-preg followed by wrapping the pre-preg on a steel rod mandrel having the desired diameter and uniformity throughout each tube.

Hybrid Pre-Preg 1—Comparative

This pre-preg comprised a plain weave woven E-glass fabric laminated to a single ply fabric of unidirectionally oriented carbon fibers (Toray T700 fibers (12K filament tows) from Toray Composite Materials America of Tacoma, Wash.). Each fabric was coated with a thermoset epoxy resin film which provided at least 30% resin content. The carbon fiber-based single ply fabric had a fiber areal density (FAD) of 120 g/m$^2$ and a resin content of 32.8% (58.7 g/m$^2$ coating weight), for a total areal density (TAD) of 178.7 g/m$^2$. The woven E-glass fabric (balanced plain weave; style 106; 50 denier E-glass fibers (102 filament bundles) from AGY Holding Corp. of Aiken, S.C.) had an FAD of 26 g/m$^2$ and resin content of 51.4% (27.5 g/m$^2$ coating weight), for a TAD of 53.5 g/m$^2$. The carbon fiber single ply fabric and woven E-glass fabric were then consolidated by conventional lamination conditions into a unitary 2-ply hybrid pre-preg with a combined FAD of 146 g/m$^2$ and total resin content of 37.3% for a TAD of 231.2 g/m$^2$.

Hybrid Pre-Preg 2

This pre-preg comprised a single ply fabric of unidirectionally oriented E-glass fibers laminated to a single ply fabric of unidirectionally oriented carbon fibers (Toray T700 fibers (12K filament tows). The carbon fiber-based single ply fabric had an FAD of 120 g/m$^2$ and resin content of 32.8% (58.7 g/m$^2$ coating weight), for a TAD of 178.7 g/m$^2$. The E-glass fiber based single ply (balanced plain weave; style 106; 50 denier E-glass fibers (102 filament bundles) from AGY Holding Corp.) fabric had an FAD of 13 g/m$^2$ and resin content of 62.3% (21.5 g/m$^2$ coating weight), for a TAD of 34.5 g/m$^2$. The two plies were laid upon each other and cross-plied by rotating one of the layers so that the fibers of layers were oriented orthogonally to each other (i.e., at 90°) and were then consolidated by conventional lamination conditions into a unitary 2-ply hybrid pre-preg with a combined FAD of 133 g/m$^2$ and resin content of 37.7% for a TAD of 217.7 g/m$^2$.

Pre-Preg Fabrication

To form the entirely non-woven, 0°/90° Hybrid Pre-preg 2, a first non-woven unidirectional (axial) web of unidirectional glass filament bundles (multifilament fibers; tows) is formed from a plurality of bundles arranged in parallel at 0°, such as illustrated in Step 1 of FIG. 6. A desired number of spools/packages of wound fibers are mounted on a creel, unwound, collimated and spread into a parallel array according to conventional methods in the art. A film of adhesive resin, such as epoxy, that is coated on one surface of a release paper is then unwound onto a surface of the parallel array, followed by laminating the film and fibers together with pressure under conventional lamination conditions, forming a resin coated fiber web that is then rolled up and transferred for further processing. As illustrated in Step 2 of FIG. 6, this rolled up 0° web of glass fibers is then cut up into a plurality of squares of a desired length, and a plurality of these cut squares are then taped together with the filaments oriented at 90° to form a 90° web. The 90° web is then rolled up and transferred for further processing. As illustrated in Step 3 of FIG. 6, the 90° web is then combined with another array of fibers formed in the same way as the 0° glass fiber web of Step 1 but instead with carbon fibers, also with a film of adhesive resin (such as epoxy) that is coated on one surface of a release paper being unwound onto a surface of the parallel array of carbon fibers. As illustrated in Step 3, the 90° web of glass fibers is then unwound onto the resin coated surface of the 0° carbon fiber web such that the resin is positioned as an intermediate adhesive between the two webs. The combined webs are then laminated together with pressure under conventional lamination conditions to form a consolidated 0°/90° hybrid pre-preg web that is then shaped into a tube.

To form Hybrid Pre-preg 1, which incorporates a woven fabric of glass fibers rather than a ply of unidirectional fibers, conventional methods in the art are used. In these examples, the process of Step 2 of FIG. 6 is skipped and a 0° carbon fiber web such as fabricated according to Step 1 of FIG. 6 is laminated to the woven fabric with an intermediate resin film (such as epoxy), analogous to Step 3 of FIG. 6.

Tube Fabrication

Several hollow tube samples were fabricated from each of hybrid pre-preg 1 and hybrid pre-preg 2 by rolling them around a steel mandrel. To form hollow tubes having a uniform diameter along its length, the pre-pregs were individually wrapped around a 48-inch long rod having a uniform inside diameter of 0.25 inches (6.35 mm). To form hollow tubes having a non-uniform, tapered diameter along its length, the pre-pregs were individually wrapped around a 48" long, cone shaped steel rod mandrel having an outer diameter of 7.92 mm on one end and gradually reducing down to a 0.76 mm outer diameter on the other end. A single pre-preg was wrapped around this mandrel, such as illustrated in FIG. 1, being wrapped a total of four revolutions around the mandrel, followed by consolidating the wrappings under heat and pressure before removing them from the mandrels, thereby producing tubes having a thickness of four times (4×) the thickness of the pre-preg. This was repeated several times for each type of pre-preg to produce the tested samples outlined below. The fiber orientation of each pre-preg was maintained during wrapping and consolidation conditions were kept uniform along the full length of the wrappings while on the mandrel. After four wrappings the tubes had a thickness of 0.5 mm and the mandrel rod was transferred to oven kept at 120° C. to cure the pre-pregs. Once the pre-pregs were fully cured, the tubes were released from the mandrel and trimmed on both ends to reduce the tube length to the desired sample size for testing crush strength and bending strength.

Examples 1-6 (Comparative) and Examples 7-12

Crush testing was performed by placing a 6.35 cm long tube sample between two flat steel platens, one of which was attached to the load cell of a Chatillon TCD500 tensile tester from Ametek, Inc. of Berwyn, Pa. The platens were pressed together to compress the tube, and the compression continued until a failure of the tube. A failure of the tube resulted in a corresponding drop of the load on the tube and this failure point was recorded for each sample. The maximum load until failure in kilograms was then recorded. Six hollow tube uniform diameter samples of each of the pre-preg types were subjected to this crush testing to measure crush resistance (hoop strength) and an average failure load was determined. The test samples of pre-preg 1 and pre-preg 2 show limited variation between samples of the same type from the average failure load, confirming that process of making the pre-pregs, the tube fabrication process and test method were consistent.

TABLE 1A

| Example (Comparative) | Pre-preg 1 (Failure load in kilograms) |
|---|---|
| 1 | 45 |
| 2 | 49 |
| 3 | 48 |
| 4 | 44 |
| 5 | 54 |
| 6 | 46 |
| | Average: 47.66 kg |

TABLE 1B

| Example | Pre-preg 2 (Failure load in kilograms) |
|---|---|
| 7 | 50 |
| 8 | 54 |
| 9 | 53 |
| 10 | 48 |
| 11 | 47 |
| 12 | 44 |
| | Average: 49.32 kg |

Examples 13-16 (Comparative) and Examples 17-20

Bend testing was performed on 48-inch (122 cm) long hollow tapered diameter tube samples having diameters of from 7.9 mm down to 0.762 mm. The samples were mounted by the wide end of the tube in a fixture and then held vertically with the wide tube end above the narrow tube end. A load cell (from the same Chatillon TCD500 tensile tester as per the above crush test) was then attached to the tip of the narrow tube end at a fixed point and the tube was then raised vertically, thereby causing the load on the tip of the narrow tube end to increase as the tube was raised and causing the tube to bend in an arc shape until a failure of the tube. A failure of the tube resulted in a corresponding drop of the load on the tube and this failure point was recorded for each sample. The bend tests were conducted on four samples of each pre-preg type and each tube type. The average failure load in kilograms for each test sample is shown below. Test samples of pre-preg 1 and pre-preg 2 showed limited variation from the mean, confirming that process of making the pre-pregs, the tube fabrication process and test method were consistent.

TABLE 2A

| Examples (Comparative) | Pre-preg 1 (Failure load in kilogram) |
|---|---|
| 13 | 6.8 |
| 14 | 6.5 |
| 15 | 6.3 |
| 16 | 4.6 |
| | Average: 6.05 kg |

TABLE 2B

| Example | Pre-preg 2 (Failure load in kilogram) |
|---|---|
| 17 | 6.6 |
| 18 | 6.3 |
| 19 | 5.4 |
| 20 | 4.3 |
| | Average: 5.65 kg |

CONCLUSIONS

The new lightweight pre-preg 2 of this disclosure, having a single carbon fiber-based unidirectional ply consolidated with a single cross-plied unidirectional ply of fiberglass, can achieve approximately the same crush strength and bending strength as the same carbon fiber-based unidirectional ply that is consolidated with a woven fiberglass ply having both warp and weft fibers, but at a lower weight since one set of fibers is effectively eliminated compared to the woven fabric. In this regard, for this testing, the woven fiberglass had twice the areal density than the unidirectional fiberglass ply. It was apparent that the fill fibers of the woven fabric provided the hoop strength and the warp fibers contributed very little, and thus the new material eliminates the warp fibers to achieve a lower weight material with no performance loss in either crush strength or bending strength.

What is claimed is:

1. A multilayer, hollow, tubular article formed from a multi-ply, hybrid composite material, said hybrid composite material comprising:
    a first unidirectional fibrous ply bonded to a second unidirectional fibrous ply, said first unidirectional fibrous ply comprising first fibers and a first polymeric binder material, wherein the first fibers and the second fibers comprise different polymers, and said second unidirectional fibrous ply comprising second fibers and a second polymeric binder material,
    wherein the first polymeric binder material and the second polymeric binder material combined comprise at least 30% by weight of the composite material,
    wherein the composite material has a fiber areal density of at least 80 grams/m$^2$,
    wherein the second fibrous ply has a fiber areal density of at least three times the fiber areal density of the first fibrous ply,
    wherein the first fibrous ply has a fiber areal density of 20 grams/m$^2$ or less, and
    wherein the second fibrous ply has a fiber areal density of at least 60 grams/m$^2$;
    wherein the hybrid composite material is overlapped onto and sealed to itself to form a multilayer, hollow, tubular article.

2. The tubular article of claim 1 wherein the first unidirectional fibrous ply has a total areal density of less than 100 g/m², the second unidirectional fibrous ply has a total areal density of at least 100 g/m², and wherein the total areal density of the second unidirectional fibrous ply is greater than 50% of the total combined areal density of the first unidirectional fibrous ply and the second unidirectional fibrous ply.

3. The tubular article of claim 1 wherein the first unidirectional fibrous ply has a fiber areal density of less than 10 grams/m² a total areal density of less than 15 grams/m².

4. The tubular article of claim 1 wherein the first fibrous ply has a greater binder content than said second fibrous ply.

5. The tubular article of claim 1 wherein the second unidirectional fibrous ply comprises carbon fibers.

6. The tubular article of claim 5 wherein the first unidirectional fibrous ply comprises polyethylene fibers.

7. The tubular article of claim 5 wherein the first unidirectional fibrous ply comprises glass fibers.

8. The tubular article of claim 1 wherein the wherein the first unidirectional fibrous ply comprises fibers having a tenacity of greater than 27 g/denier.

9. The tubular article of claim 1 wherein the wherein the first unidirectional fibrous ply comprises fibers having a denier of less than 1000.

10. The tubular article of claim 1 wherein the first fibers of the first unidirectional fibrous ply and the second fibers of the second unidirectional fibrous ply are cross-plied relative to each other, wherein the first fibers are axially oriented at 0° and wherein the second fibers are oriented at a bias angle relative to said first fibers.

11. The tubular article of claim 1 wherein the first polymeric binder material and the second polymeric binder material combined comprise from 30% by weight up to 45% by weight of the composite material.

12. The tubular article of claim 1 wherein the first polymeric binder material and the second polymeric binder material comprise chemically different polymers.

13. The tubular article of claim 1 wherein the first polymeric binder material comprises a thermoplastic polymer and the second polymeric binder material comprises a thermosetting polymer.

14. The tubular article of claim 1 wherein the second fibrous ply has a fiber areal density of at least four times the fiber areal density of the first fibrous ply.

15. The tubular article of claim 1 wherein the article has a length and has a uniform areal density along its entire length.

16. The tubular article of claim 1 wherein the article has a length and has a non-uniform areal density along its entire length.

17. The tubular article of claim 1 wherein the article has alternating areas of high polymeric binder material concentration and areas of low polymeric binder material concentration areas, wherein a portion of the polymeric binder material from the first fibrous ply penetrates into the second fibrous ply.

18. A process for forming a multilayer, hollow, tubular article comprising a multi-ply, hybrid composite material, the process comprising:
 a) forming a first unidirectional fibrous ply comprising first fibers and a first polymeric binder material on a release substrate, wherein the first fibrous ply has a fiber areal density of 20 grams/m² or less;
 b) providing a second unidirectional fibrous ply comprising second fibers and a second polymeric binder material, wherein the second fibrous ply has a fiber areal density of at least 60 grams/m² and wherein the first fibers and the second fibers comprise different polymers;
 c) laminating the first unidirectional fibrous ply onto the second unidirectional fibrous ply,
 d) removing the release substrate, whereby the first unidirectional fibrous ply remains on and is adhered to the second unidirectional fibrous ply, thereby forming a multi-ply, hybrid composite material wherein the first polymeric binder material and the second polymeric binder material combined comprise at least 30% by weight of the composite material, and wherein the composite material has a fiber areal density of at least 80 grams/m²;
 e) forming the composite material into a tubular structure by wrapping the composite material around itself, leaving a hollow central opening; and
 f) optionally subjecting the tubular structure to heat and/or pressure to consolidate the first and second unidirectional fiber plies together.

19. The process of claim 18 wherein step e) is conducted by wrapping the composite material around a mandrel and wherein step f) is conducted.

20. A multi-ply, hybrid composite material comprising:
 a first ply of unidirectionally oriented elongate bodies bonded to a second ply of unidirectionally oriented elongate bodies, said first ply comprising first elongate bodies and a first polymeric binder material and said second ply comprising second elongate bodies and a second polymeric binder material, wherein the first elongate bodies and the second elongate bodies comprise different polymers,
 wherein the first polymeric binder material and the second polymeric binder material combined comprise at least 30% by weight of the composite material,
 wherein the composite material has a fiber areal density of at least 80 grams/m²,
 wherein the first ply has a fiber areal density of 20 grams/m² or less, and
 wherein the second ply has a fiber areal density of at least 60 grams/m².

* * * * *